Dec. 19, 1967    H. A. CLEMENTS    3,358,800
SYNCHRONOUS SELF-SHIFTING CLUTCHES
Filed Sept. 29, 1965    6 Sheets-Sheet 3

Dec. 19, 1967  H. A. CLEMENTS  3,358,800
SYNCHRONOUS SELF-SHIFTING CLUTCHES
Filed Sept. 29, 1965  6 Sheets-Sheet 4

United States Patent Office 3,358,800
Patented Dec. 19, 1967

3,358,800
SYNCHRONOUS SELF-SHIFTING CLUTCHES
Herbert Arthur Clements, Weybridge, England, assignor to S.S.S. Patents Limited, London, England
Filed Sept. 29, 1965, Ser. No. 491,253
Claims priority, application Great Britain, Oct. 8, 1964, 41,156/64
5 Claims. (Cl. 192—67)

ABSTRACT OF THE DISCLOSURE

A synchronous self-shifting clutch including mechanism for cushioning the take-up of the load after the clutch has engaged.

---

This invention relates to synchronous self-shifting toothed clutches of the type comprising first and second clutch members, and clutch actuating mechanism operative upon passage of the said clutch members through rotational synchronism, said mechanism including an intermediate member movable helically relative to one of said clutch members to effect at least partial interengagement of the coacting clutch teeth.

The object of the invention is to provide a clutch of this type wherein dashpot mechanism is provided which is effective to cushion the take-up of load by the clutch without involving relative sliding under load of the clutch teeth, and hence without imparting end thrust to the driving and driven members of the clutch due to such relative sliding movement under load during the clutch engagement.

In accordance with the invention a clutch of the type referred to is provided with a further clutch member and with means providing lost motion travel in the rotary sense between one of said clutch members and said further clutch member when the clutch is in the disengaged condition, and dashpot mechanism being provided in association with said lost motion travel means and being effective in the rotary sense, viz. about the clutch axis, when the clutch teeth have moved into full engagement, the take-up of load by the clutch involving relative angular movement, cushioned by fluid in the said dashpot mechanism, between said one clutch member and said further member, to take up the lost motion.

Figure 1:
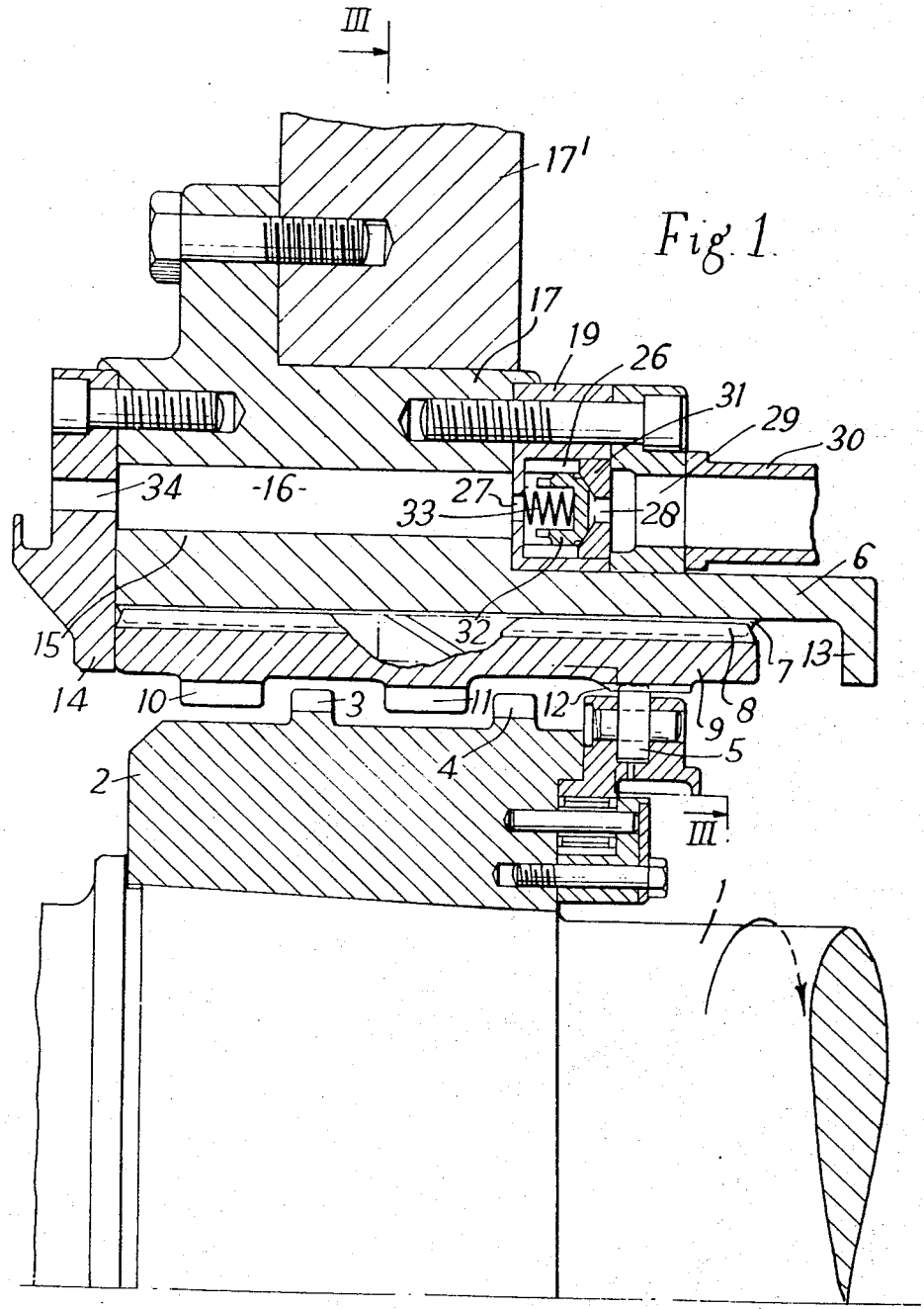
Figure 2:
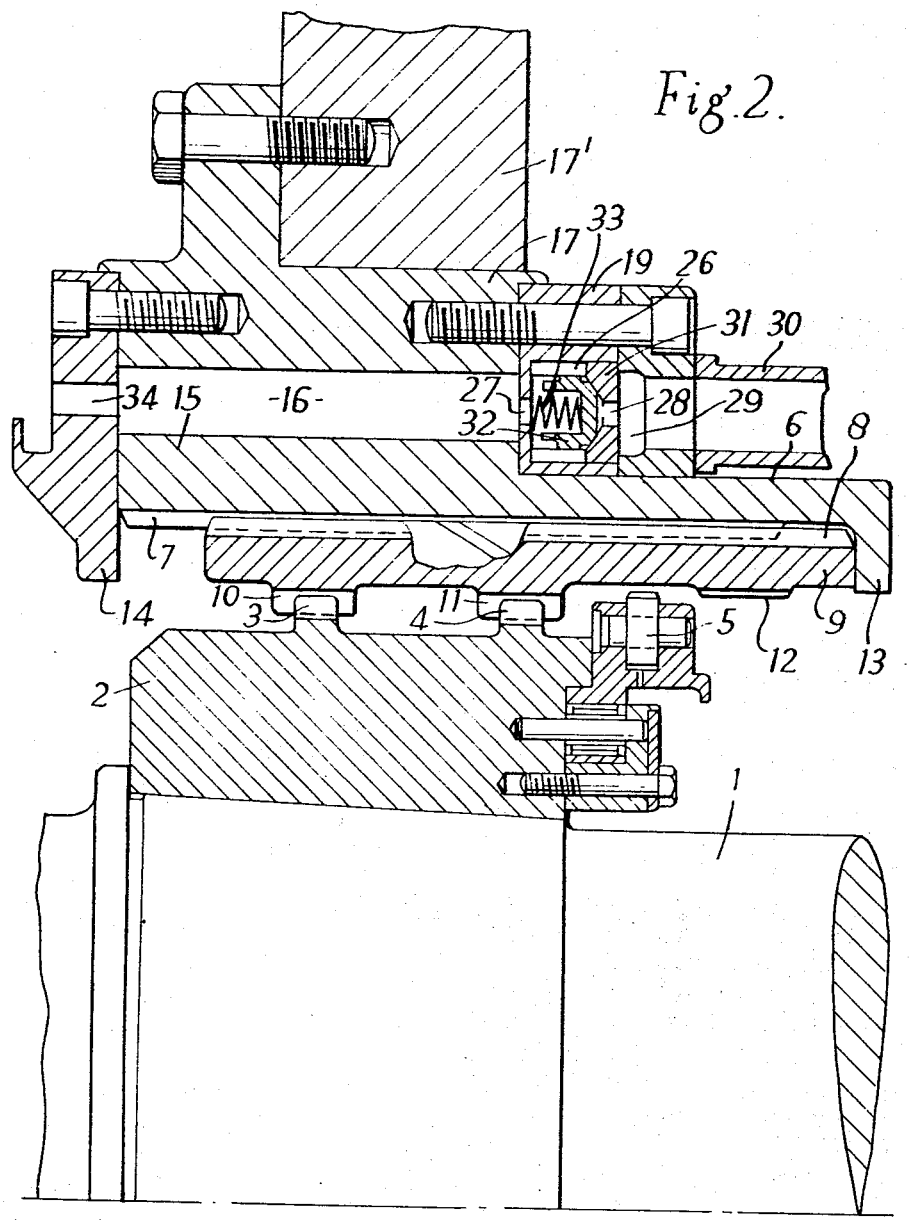
Figure 3:
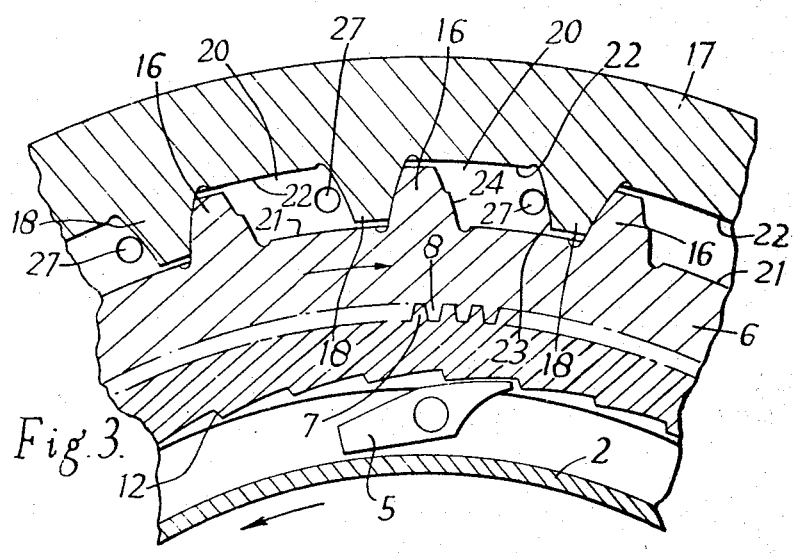
Figure 4:
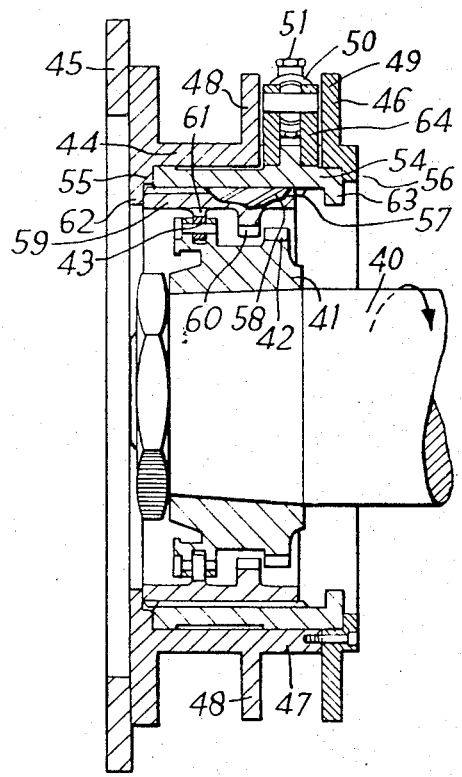
Figure 5:
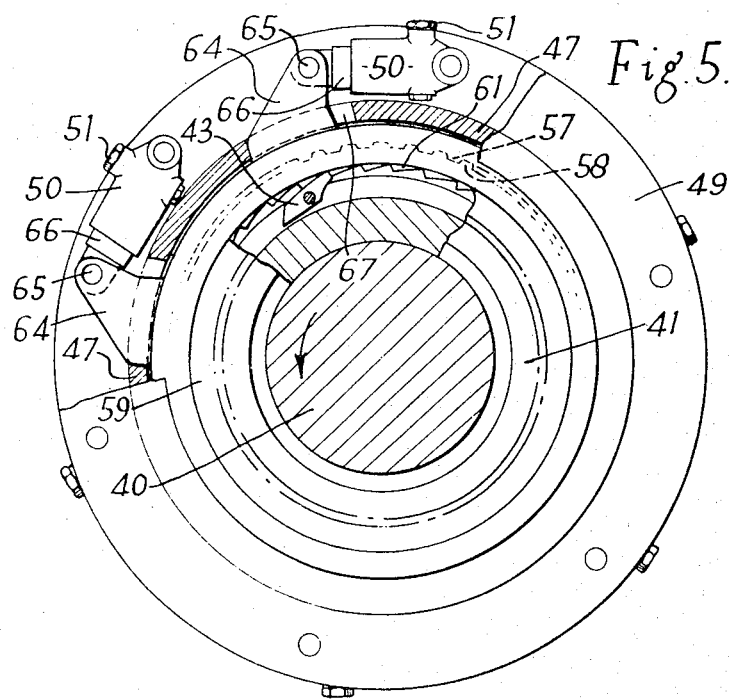
Figure 6:
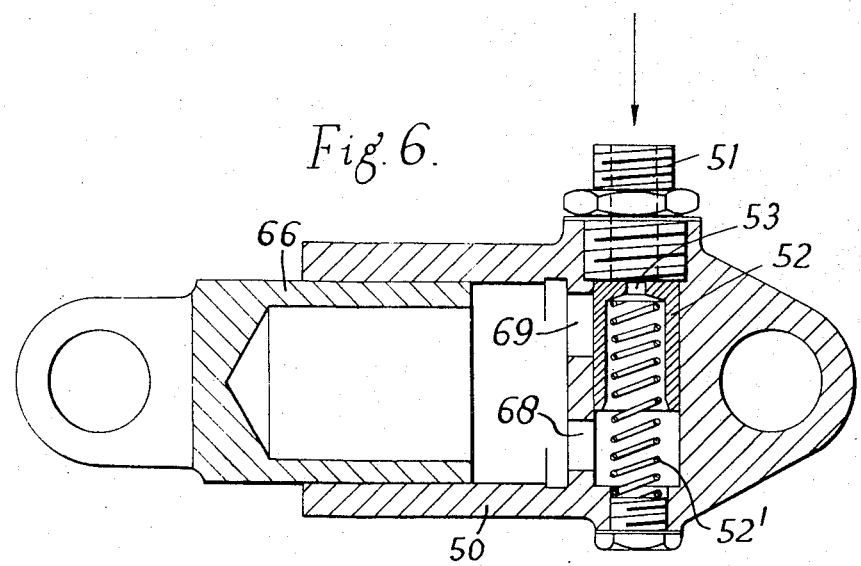
Figure 7:
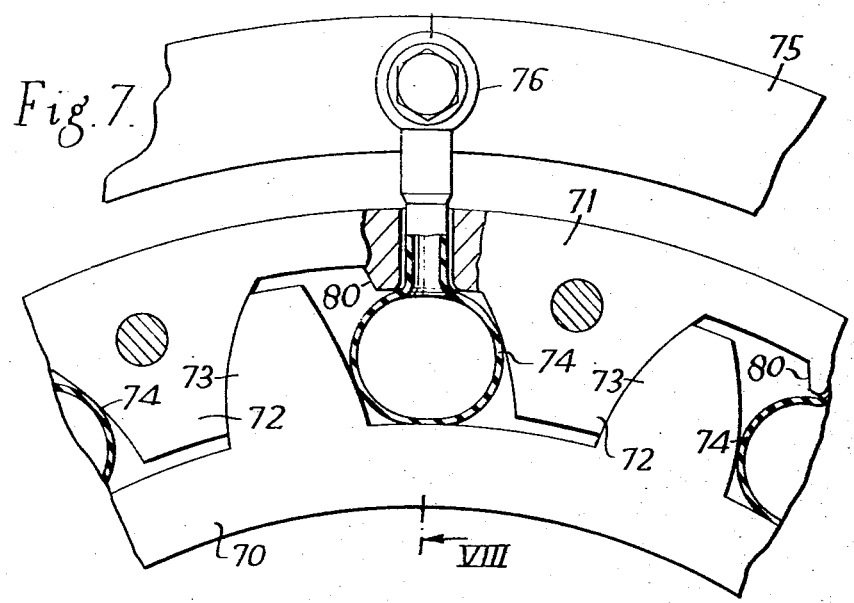
Figure 8:
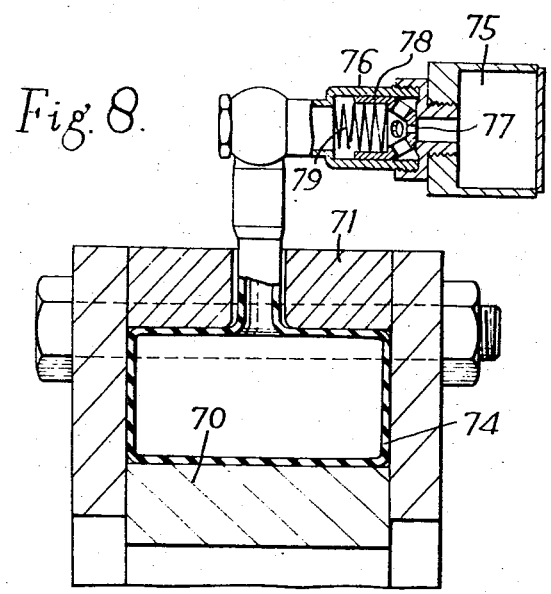
Figure 9:
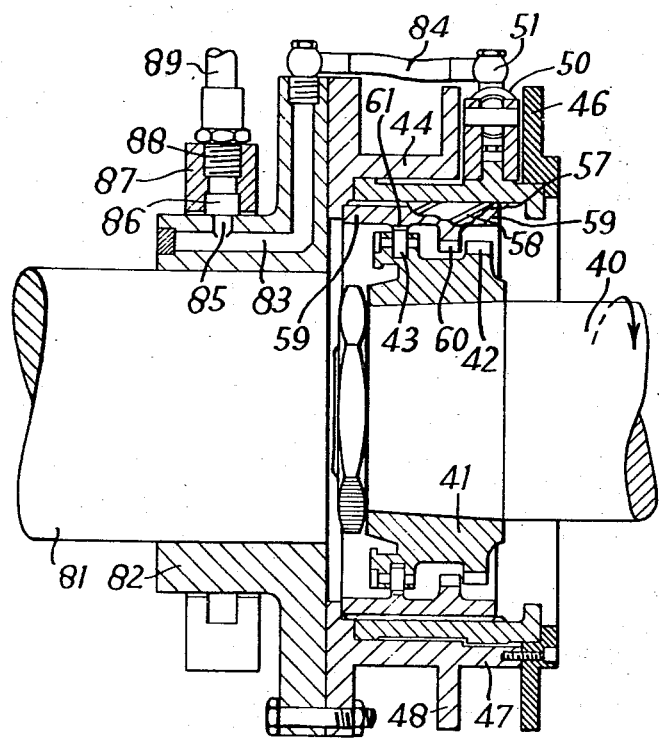

In the accompanying drawings,

FIG. 1 is a view in longitudinal section of a clutch according to the invention arranged as a unidirectional freewheel wherein the said further clutch member is fixed, the clutch being shown in the disengaged condition, FIG. 2 is a view similar to FIG. 1 but showing the clutch in the engaged condition, FIG. 3 is a sectional view of part of the clutch on the line III—III of FIG. 1, FIG. 4 is a view in longitudinal section of another clutch according to the invention wherein the said further clutch member is fixed, FIG. 5 is an end view partly in section of the clutch as seen from the right in FIG. 4, FIG. 6 is an enlarged sectional view of a valve, cylinder and piston assembly used in the clutch shown in FIGS. 4 and 5, FIG. 7 is a view partly in section of part of another clutch according to the invention wherein the said further clutch member is fixed, FIG. 8 is a view partly in section on the line VIII—VIII of FIG. 7, and FIG. 9 shows in longitudinal section a modification of the clutch shown in FIGS. 4 and 5 wherein the said further clutch member is mounted for rotation with a shaft.

Referring to FIGS. 1 to 3, the unidirectional freewheel device illustrated comprises a first clutch member constituted by a shaft 1 on which is fixed a ring 2 formed with axially spaced rings of clutch teeth 3 and 4 and carrying a ring of pawls 5, and the second clutch member is a sleeve 6 coaxial with the clutch member 1 and formed with internal right hand helical splines 7 with which engage external helical splines 8 on an intermediate member constituted by a clutch sleeve 9 arranged between and concentric with clutch members 1 and 6 and formed with two axially spaced rings of internal clutch teeth 10 and 11 and a ring of internal ratchet teeth 12. The helical movement of the intermediate member 9 relative to the clutch member 6 is limited in one direction by an axial stop 13 on the clutch member 6. Said helical movement is limited in the other direction by an end ring 14.

The clutch member 6 is provided over part of its length with a radially outwardly projecting flange 15 formed with a ring of projections constituted by widely spaced external teeth 16, and around the flange 15 and coaxial with the second clutch member is arranged an annular further clutch member 17 which is bolted to a stationary abutment 17' and is formed with a ring of projections constituted by widely spaced internal teeth 18 (FIG. 3) that project into the spaces between the teeth 16. The end ring 14 and a further end ring 19 bolted to the member 17 extend radially inwardly over the ends of the spaces between the teeth 16 and 18, whereby to form a ring of dashpot chambers 20 (FIG. 3) each bounded by the end rings 14 and 19, an inter-tooth surface 21 of the clutch member 6, an inter-tooth surface 22 of the further clutch member 17, and the spaced facing flanks of an external tooth 16 and an internal tooth 18. With the clutch disengaged, as shown in FIGS. 1 and 3 each tooth 18 has the flank that does not bound a dashpot chamber 20 in contact with the flank of the adjacent tooth 16 that does not bound the adjacent dashpot chamber 20, viz. the flank 23 of each tooth 18 bounding a dashpot chamber 20 is spaced away from the flank 24 of the tooth 16 bounding the same dashpot chamber 20.

The ring 19 is formed with cavities 26 of cylindrical form spaced around the clutch axis such that one cavity 26 is associated with each dashpot chamber 20, each cavity 26 communicating via an oil transfer port 27 with its associated dashpot chamber, the port 27 opening into the dashpot chamber 20 adjacent the flank of the tooth 18 bounding the chamber 20 (FIG. 3). Each cavity 26 also communicates via an oil transfer port 28, with an annular duct 29 to which oil is fed under pressure via pipes, one of which is shown at 30, equally spaced around the duct 29, the said pipes communicating with an oil pressure source. Each cylindrical cavity 26 contains a valve seat 31 for a valve member 32 which is adapted to open in the direction (to the left in FIGS. 1 and 2) to allow oil to flow from the pressure source and around the valve member 32 to the dashpot chamber 20 (FIG. 3) but to close in the other direction, the valve member 32 being under the action of a light compression spring 33.

The operation is as follows.

During rotation of the shaft 1 in the freewheeling direction indicated by the arrows in FIGS. 1 and 3, the pawls 5 ratchet relatively to the ratchet teeth 12. The intermediate member 9 is against the stop 14, with its rings of clutch teeth 10 and 11 spaced axially from the rings of clutch teeth 3 and 4 respectively, and the dashpot chambers 20 are charged with oil under pressure through the pipes 30. When the rotation of the shaft 1 tends to reverse, pawls 5 engage ratchet teeth 12, and the intermediate member 9 is shifted helically (to the right in FIG. 1) relative to the clutch member 6, bringing its clutch teeth 10 and 11 precisely into initial interengagement with the coacting clutch teeth 3 and 4 respectively.

The interaction between the lightly loaded clutch teeth then draws the intermediate member 9 into full toothed engagement with the shaft 1, the intermediate member 9 coming against the axial stop 13. Thereupon the driving connection between the clutch members 1 and 6 causes the clutch member 6 to move angularly relative to the member 17, viz. clockwise in FIG. 3, the external teeth 16 of the clutch member 6 moving angularly relative to the internal teeth 18 of the clutch member 17 in the direction to compress the oil in the dashpot chambers 20. This action causes the valve members 32 to be applied firmly to their seats so that oil can be forced to the nonpressure sides of the teeth 18 only through the closely restricted clearances between the teeth 16 and 18 and the coacting surfaces of the clutch members 6 and 17. The clutch member 1 is arrested smoothly by the oil pressure within the dashpot chambers 20 before the dashpot bounding flanks of the teeth 16 and 18 come into contact.

When the shaft 1 again rotates in the direction of the arrows, the teeth 16 and 18 disengage due to the interaction of the clutch teeth 3, 4 and 10, 11 and the pressure of oil feeding the dashpot chambers 20 through the now open valves 32 acts on the adjacent facing flanks of the teeth 16 and 18, urging these teeth apart and recharging the dashpot chambers 20, the oil that previously served to cushion the take up of load being expelled through drain orifices 34.

The clutch illustrated in FIGS. 4, 5 and 6 comprises a first clutch member constituted by a shaft 40 on which is mounted a hub 41 formed with a ring of clutch teeth 42 and carrying pawls one of which is shown at 43. Around the shaft 40 and coaxial therewith is arranged a flanged ring 44 fixed to a stationary ring 45. A flanged ring 46 is bolted to a cylindrical portion 47 of the ring 44.

An annular channel is formed between flanges 46 and 48, and a plurality of hydraulic cylinders 50 spaced around the clutch axis are bolted to these flanges. Each cylinder 50 (see FIG. 6) has a pressure oil inlet 51 and contains a spring controlled valve member 52 with a restricted orifice 53.

Radially within the rings 46 and 48 is disposed an annular second clutch member 54 which is coaxial with the shaft 40 and is angularly movable about the clutch axis relative to the fixed rings 46 and 48, which together constitute the further clutch member referred to above, the clutch member 54 being guided laterally by flanges 55 and 56 on the rings 46 and 48 respectively. The clutch member 54 is formed with internal helical splines 57 with which engage left hand external helical splines 58 on an intermediate member in the form of a clutch sleeve 59 formed with a ring of clutch teeth 60 and a ring of internal ratchet teeth 61. Axial stops 62 and 63 serve to limit the helical movement of the clutch sleeve 59 relative to the clutch member 54.

The clutch member 54 is formed with pairs of lugs 64 projecting radially outwardly through slots 67 in the cylindrical portion 47, the pairs of lugs 64 being spaced uniformly about the clutch axis and pivotally connected by pins 65 to pistons 66 (FIG. 6) located in the cylinders 50.

When the shaft 40 is rotating in the freewheeling direction shown by the arrows the pawls 43 ratchet relative to the ratchet teeth 61, and the clutch is disengaged as shown in FIG. 4, with the lugs 64 in contact at their left hand ends as seen in FIG. 5 with the adjacent ends of the slots 67. The cylinders 50 are charged with oil supplied under pressure to the inlets 51.

When the direction of rotation of the shaft 40 reverses, pawls 43 engage ratchet teeth 61, and the clutch sleeve 59 is shifted helically relative to the clutch member 54 into engagement with the stop 63, bringing the clutch teeth 42 and 60 fully into engagement. The shaft 40 and the second clutch member 54 then rotate together through a limited angular movement against the damping action of the hydraulic cylinders 50, from which the oil is expelled slowly through ports 68 and the restricted orifices 53, bringing the shaft 40 to a standstill before the right hand ends of the lugs 64, as seen in FIG. 5, are in contact with the adjacent ends of the slots 67. When the shaft 40 again rotates in the direction of the arrows the lugs 64 and the pistons 66 are moved angularly back to their previous end positions as shown in FIG. 5, and the cylinders 50 are recharged with oil through ports 69, which are opened by the movement of valve members 52 against the light springs 52'.

FIGS. 7 and 8 show a modification of the dashpot mechanism that may be applied to either of the clutches already described. The part 70 is the second clutch member, corresponding to the member 6 of FIGS. 1 to 3 or the member 54 of FIGS. 4 and 5, and the fixed further member 71 corresponds to the member 17 of FIGS. 1 to 3 or the members 44, 46 of FIGS. 4 and 5. The member 71 is formed with a ring of widely spaced internal teeth 72, and the clutch member 70 is formed with a ring of widely spaced external teeth 73, and between the left hand flank, as seen in FIG. 7 of each tooth 72 and the facing right hand flank of the adjacent tooth 73 is provided a cylindrical bag 74 of flexible material, e.g. oil resistant rubber, connected to an oil feed manifold 75 via a valve 76 comprising a valve member 78 with a restricted orifice 77.

When the clutch is freewheeling the teeth 72 and 73 have the relative positions shown in FIG. 7, whereas when the first clutch member, which is not shown but corresponds to the shaft 1 of FIGS. 1 to 3 or the shaft 40 of FIGS. 4 and 5, reverses its rotation the clutch engages, and thereafter the clutch member 70 rotates relative to the member 71 (clockwise in FIG. 7) against the damping action exerted by the oil-filled bags 74, from which the oil is slowly discharged through the orifices 77 until the rotation is arrested before the tips of the right hand flanks of the teeth 73 are in contact with abutments 80 on the member 71. When the first clutch member (not shown) again rotates in the freewheeling direction the clutch member 70 carrying the teeth 73 moves angularly to the previous end position, shown in FIG. 7, the bags 74 being recharged with oil through the valve members 78 that open by moving to the left in FIG. 8 against the action of the light springs 79.

FIG. 9 shows a clutch which is similar in many respects to the clutch shown in FIGS. 4 and 5 but in which the further clutch member 44, 46 is rotatable with a shaft 81 instead of being fixed. A flange member 82 rotatable with the shaft 81 is formed with a ring of angularly spaced ducts 83 connected by pipes 84 to the inlets 51 of the respective cylinders 50, and connected by ports 85 to an annular duct 86 in a stationary muff 87 in which a duct 88 leads from the duct 86 to a pressure oil supply pipe 89.

When the shaft 40 rotates in the freewheeling direction of the arrow relative to the shaft 81 the clutch is disengaged, as shown. When the direction of relative rotation of the shafts 40 and 81 tends to reverse the clutch engages and a driving connection is established between the shafts. The take up of the load is cushioned by the dashpot cylinders 50 as described with reference to FIGS. 4 to 6.

I claim:
1. A synchronous self-shifting clutch comprising:
   coacting clutch teeth,
   first and second rotary clutch members, and
   clutch actuating mechanism operative upon passage of said clutch members through rotational synchronism, said mechanism including an intermediate member movable helically relative to one of said clutch members to effect at least partial engagement of said coacting clutch teeth, with means for limiting the helical movement of said intermediate member in the clutch engaging and disengaging directions relative to said one clutch member, wherein the improvement comprises a further member arranged with lost motion in the rotary sense between said further member and one of said clutch members when the clutch is in a disengaged condition, whereby the take-up of load by the clutch involves, subsequent to engagement of the clutch, taking up of the lost motion by relative angular movement of said last-mentioned clutch member and said further member, and dashpot mechanism effective between said last-mentioned clutch member and said further member to damp said relative angular movement and thereby cushion the take-up of the load following engagement of the clutch.

2. A synchronous self-shifting clutch according to claim 1 wherein said dashpot mechanism includes at least one dashpot chamber bounded by the flanks of interengaged projections on said last-mentioned clutch member and on said further clutch member.

3. A synchronous self-shifting clutch according to claim 1 wherein said dashpot mechanism includes at least one dashpot cylinder with a piston therein, the cylinder being connected to one of said last-mentioned and further clutch members and the piston being connected to the other of said last-mentioned and further clutch members.

4. A synchronous self-shifting clutch according to claim 1 wherein said dashpot mechanism includes at least one container of flexible material, for cushioning fluid, located between interengaging projections on said last-mentioned clutch member and said further member.

5. A synchronous self-shifting clutch according to claim 1 including means for permitting restricted flow of fluid from said dashpot mechanism during relative movement of said last-mentioned clutch member and said further member in the direction to take up said lost motion, and for permitting rapid recharging of said dashpot mechanism upon relative movement of said last-mentioned clutch member and said further member in the other direction.

References Cited

UNITED STATES PATENTS

| | | | |
|---|---|---|---|
| 2,913,084 | 11/1959 | Short | 192—67 |
| 3,106,276 | 10/1963 | Clements | 192—67 X |
| 3,189,148 | 6/1965 | Sinclair et al. | 192—67 |
| 3,203,526 | 8/1965 | Clements | 192—67 |

DONLEY J. STOCKING, *Primary Examiner.*

ARTHUR T. McKEON, *Examiner.*